US012573129B2

(12) United States Patent
Jang et al.

(10) Patent No.: US 12,573,129 B2
(45) Date of Patent: Mar. 10, 2026

(54) METHOD AND DEVICE FOR REPRESENTING RENDERED SCENES

(71) Applicant: SAMSUNG ELECTRONICS CO., LTD., Suwon-si (KR)

(72) Inventors: Seokhwan Jang, Suwon-si (KR); Nahyup Kang, Suwon-si (KR); Jiyeon Kim, Suwon-si (KR); Hyewon Moon, Suwon-si (KR); Donghoon Sagong, Suwon-si (KR); Minjung Son, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 462 days.

(21) Appl. No.: 18/096,972

(22) Filed: Jan. 13, 2023

(65) Prior Publication Data

US 2024/0054716 A1    Feb. 15, 2024

(30) Foreign Application Priority Data

Aug. 9, 2022    (KR) ........................ 10-2022-0099247

(51) Int. Cl.
| | |
|---|---|
| *G06T 15/08* | (2011.01) |
| *G06N 3/045* | (2023.01) |
| *G06N 3/08* | (2023.01) |
| *G06N 3/09* | (2023.01) |
| *G06T 7/40* | (2017.01) |

(Continued)

(52) U.S. Cl.
CPC ............. *G06T 15/08* (2013.01); *G06N 3/045* (2023.01); *G06N 3/08* (2013.01); *G06N 3/09* (2023.01); *G06T 7/40* (2013.01); *G06T 7/50* (2017.01); *G06T 15/005* (2013.01); *G06T 15/06* (2013.01);

(Continued)

(58) Field of Classification Search
None
See application file for complete search history.

(56) References Cited

U.S. PATENT DOCUMENTS

| | | | |
|---|---|---|---|
| 2009/0219287 A1* | 9/2009 | Wang ...................... | G06T 15/50 |
| | | | 715/764 |
| 2022/0036602 A1 | 2/2022 | Duckworth et al. | |

FOREIGN PATENT DOCUMENTS

| | | | |
|---|---|---|---|
| CN | 113888689 A | 1/2022 | |

OTHER PUBLICATIONS

Author: Wang et al.; Title: Image and Distribution Based vol. Rendering for Large Data Sets; Publication: IEEE; Source: https://ieeexplore.ieee.org/stamp/stamp.jsp?tp=&arnumber=8365973 (Year: 2018).*

(Continued)

*Primary Examiner* — Jwalant Amin
(74) *Attorney, Agent, or Firm* — Sughrue Mion, PLLC

(57)    ABSTRACT

Disclosed are a method and device for representing rendered scenes. A data processing method of training a neural network model includes obtaining spatial information of sampling data, obtaining one or more volume-rendering parameters by inputting the spatial information of the sampling data to the neural network model, obtaining a regularization term based on a distribution of the volume-rendering parameters, performing volume rendering based on the volume-rendering parameters, and training the neural network model to minimize a loss function determined based on the regularization term and based on a difference between a ground truth image and an image that is estimated according to the volume rendering.

21 Claims, 12 Drawing Sheets

(51) Int. Cl.
    G06T 7/50         (2017.01)
    G06T 15/00       (2011.01)
    G06T 15/06       (2011.01)

(52) U.S. Cl.
    CPC .............................. *G06T 2200/04* (2013.01);
              *G06T 2207/20081* (2013.01); *G06T*
                      *2207/20084* (2013.01)

(56)             References Cited

OTHER PUBLICATIONS

Author: Wang et al.; Title: Statistical Visualization and Analysis of Large Data Using a Value-based Spatial Distribution; Publication: IEEE; Source: https://ieeexplore.ieee.org/stamp/stamp.jsp?tp=&arnumber=8031590 (Year: 2017).*

Author: Sakhaee et al.; Title: A Statistical Direct vol. Rendering Framework for Visualization of Uncertain Data; Publication: IEEE; Source: https://ieeexplore.ieee.org/stamp/stamp.jsp?tp=&arnumber=7778257 (Year: 2016).*

Acu, Ana-Maria, et al. "Information potential for some probability density functions." Applied Mathematics and Computation 389 (2021): 125578, (15 pages).

Chang, Di, et al. "RC-MVSNet: Unsupervised Multi-View Stereo with Neural Rendering." European Conference on Computer Vision. Cham: Springer Nature Switzerland, arXiv:2203.03949v3 [cs.CV] Jul. 13, 2022, (24 pages).

Oechsle, Michael, et al. "UNISURF: Unifying Neural Implicit Surfaces and Radiance Fields for Multi-View Reconstruction." Proceedings of the IEEE/CVF International Conference on Computer Vision. 2021, (11 pages).

Extended European search report issued on Dec. 20, 2023, in counterpart European Patent Application No. 23164183.8 (12 pages).

Arandjelovic et al. "Nerf in detail: Learning to sample for view synthesis." *arXiv preprint arXiv:2106.05264*, Jun. 9, 2021 (pp. 1-22).

Fang et al. "Neusample: Neural sample field for efficient view synthesis." *arXiv preprint arXiv:2111.15552*, Nov. 30, 2021 (pp. 1-11).

Mildenhall et al. "Nerf: Representing scenes as neural radiance fields for view synthesis." *Communications of the ACM* vol. 65 No.1, Jan. 2022. (pp. 99-106).

Ahn et al. "PANeRF: Pseudo-view Augmentation for Improved Neural Radiance Fields Based on Few-shot Inputs." *arXiv preprint arXiv:2211.12758*, Nov. 23, 2022 (pp. 1-10).

\* cited by examiner

<u>100A</u>

Input data

Output data

200

500

500

700

800

METHOD AND DEVICE FOR REPRESENTING RENDERED SCENES

CROSS-REFERENCE TO RELATED APPLICATIONS

This application claims the benefit under 35 USC § 119(a) of Korean Patent Application No. 10-2022-0099247, filed on Aug. 9, 2022, in the Korean Intellectual Property Office, the entire disclosure of which is incorporated herein by reference for all purposes.

BACKGROUND

1. Field

The following description relates to a method and device for representing rendered scenes, and more particularly, to a method of transforming volume rendering parameters to fit the parameters for a desired feature.

2. Description of Related Art

Three-dimensional (3D) rendering is a field of computer graphics for rendering a 3D model. 3D rendering is used in various application fields, such as a 3D gaming, virtual reality, animation, movies/media, and the like. 3D rendering techniques include ray-tracing rendering, radiosity rendering, and rasterization rendering, in which the ray-tracing rendering renders a 3D model by tracing the path of light that is emitted from a light source and reflected from a surface, the radiosity rendering uses an indirect lighting effect caused by diffuse reflection or reflected light that is generated when direct light is reflected by an object other than a direct lighting effect, and the rasterization rendering renders a 3D model by converting vector data to a pixel-pattern image.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a method of training a neural network model includes:

obtaining spatial information of sampling data; obtaining one or more volume-rendering parameters by inputting the spatial information of the sampling data to the neural network model; obtaining a regularization term based on a distribution of the volume-rendering parameters; performing volume rendering based on the volume-rendering parameters; and training the neural network model to minimize a loss function determined based on the regularization term and based on a difference between a ground truth image and an image that is estimated according to the volume rendering.

The training the neural network model may include training the neural network model such that the distribution of the volume-rendering parameters has a predetermined feature.

The training the neural network model may include training the neural network model such that the distribution of the volume-rendering parameters is clustered on a surface of a scene.

The obtaining the regularization term may include obtaining the regularization term based on a metric quantifying a feature of the distribution of the volume-rendering parameters.

The obtaining the regularization term may include obtaining an entropy measure corresponding to the distribution of the volume-rendering parameters and obtaining an information potential corresponding to the volume-rendering parameters, based on the entropy measure.

The training the neural network model may include training the neural network model may be performed such that the information potential is maximized.

The loss function may be determined by adding a second loss function to a first loss function, in which the first loss function is determined based on the difference between the ground truth image and the image that is estimated through the volume rendering and the second loss function is determined based on the regularization term.

The obtaining the regularization term may include obtaining the distribution of the volume-rendering parameters corresponding to sample point of sampling data included in a set of sample points in a predetermined area, obtaining a statistical value of the distribution of the volume-rendering parameters corresponding to of the sample points, and determining the statistical value to be the regularization term.

The obtaining the spatial information of the sampling data may include obtaining spatial information of a ray and obtaining sampling information.

In another general aspect, a scene representation method includes obtaining spatial information of sampling data, the sampling data sampled from a three-dimensional (3D) model; and performing volume rendering of the 3D model by inputting the spatial information of the sampling data to a neural network model that generates one or more volume rendering parameters, in which the spatial information of the sampling data is determined based on a distribution of the one or more volume rendering parameters.

The neural network model may be trained to transform the distribution of the one or more volume rendering parameters to perform the volume rendering.

The spatial information of sampling data may include at least one of position information and information on the number of pieces of sampling data.

The obtaining the spatial information of sampling data may further include obtaining a depth map corresponding to a scene of the 3D model.

The obtaining the spatial information of sampling data may further include obtaining information on a surface of the 3D model.

The obtaining the spatial information of the sampling data may include obtaining spatial information of a ray and obtaining sampling information.

In another general aspect, an electronic device includes: one or more processors; memory storing instructions configured to, when executed by the one or more processors, cause the one or more processors to: obtain spatial information of sampling data, obtain one or more volume-rendering parameters by inputting the spatial information of the sampling data to a neural network model, obtain a regularization term based on a distribution of the volume-rendering parameters, perform volume rendering based on the volume-rendering parameters, and train the neural network model to minimize a loss function determined based on the regularization term and based on a difference between a ground truth image and an image that is estimated according to the volume rendering.

The instructions may be further configured to cause the one or more processors to train the neural network model such that the distribution of the volume-rendering parameters has a predetermined feature.

The instructions may be further configured to cause the one or more processors to train the neural network model such that the distribution of the volume-rendering parameters is clustered on a surface of a scene.

The instructions may be further configured to cause the one or more processors to obtain the regularization term based on a metric for quantifying a feature of the distribution of the volume-rendering parameters.

In another general aspect, an electronic device includes one or more processors configured to obtain spatial information of sampling data, the sampling data sampled from a three-dimensional (3D) model, and perform volume rendering of the 3D model by inputting the spatial information of the sampling data to an neural network model that generates one or more volume rendering parameters, wherein the spatial information of the sampling data is determined based on a distribution of the volume rendering parameters.

Other features and aspects will be apparent from the following detailed description, the drawings, and the claims.

Figure 1A:
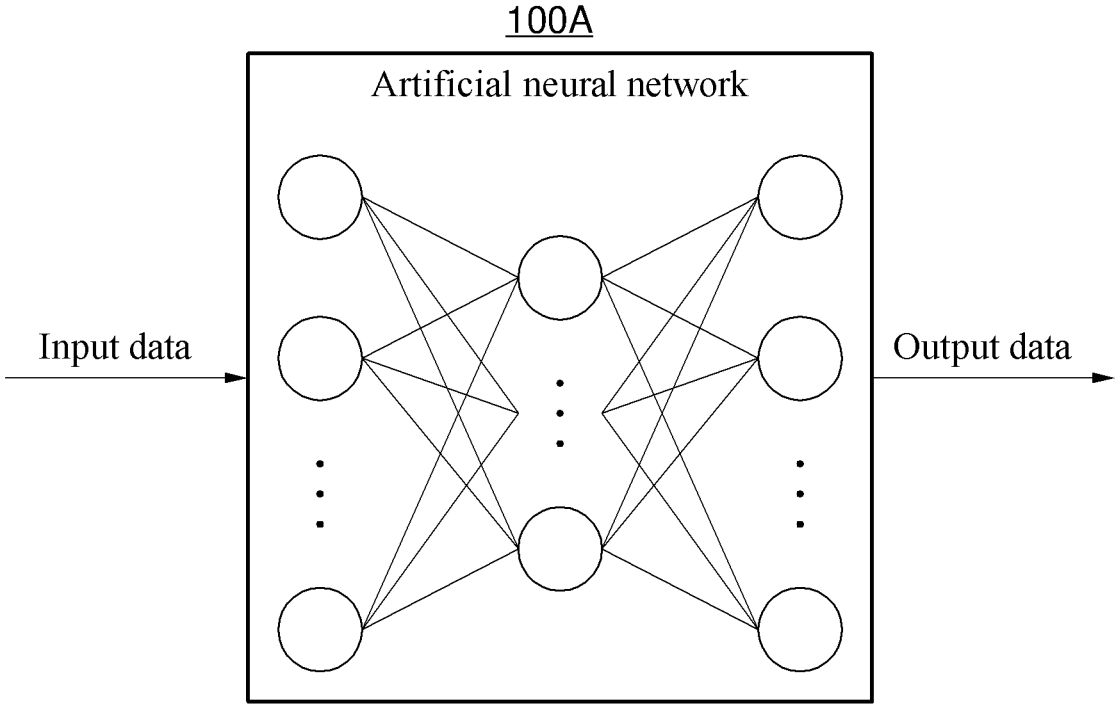
FIG. 1A illustrates an example of a deep-learning operation using an artificial neural network, according to one or more embodiments.

Throughout the drawings and the detailed description, unless otherwise described or provided, the same or like drawing reference numerals will be understood to refer to the same or like elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for describing various examples only and is not to be used to limit the disclosure. The articles "a," "an," and "the" are intended to include the plural forms as well, unless the context clearly indicates otherwise. As used herein, the term "and/or" includes any one and any combination of any two or more of the associated listed items. As non-limiting examples, terms "comprise" or "comprises," "include" or "includes," and "have" or "has" specify the presence of stated features, numbers, operations, members, elements, and/or combinations thereof, but do not preclude the presence or addition of one or more other features, numbers, operations, members, elements, and/or combinations thereof.

Throughout the specification, when a component or element is described as being "connected to," "coupled to," or "joined to" another component or element, it may be directly "connected to," "coupled to," or "joined to" the other component or element, or there may reasonably be one or more other components or elements intervening therebetween. When a component or element is described as being "directly connected to," "directly coupled to," or "directly joined to" another component or element, there can be no other elements intervening therebetween. Likewise, expressions, for example, "between" and "immediately between" and "adjacent to" and "immediately adjacent to" may also be construed as described in the foregoing.

Although terms such as "first," "second," and "third", or A, B, (a), (b), and the like may be used herein to describe various members, components, regions, layers, or sections, these members, components, regions, layers, or sections are not to be limited by these terms. Each of these terminologies is not used to define an essence, order, or sequence of corresponding members, components, regions, layers, or sections, for example, but used merely to distinguish the corresponding members, components, regions, layers, or sections from other members, components, regions, layers, or sections. Thus, a first member, component, region, layer, or section referred to in the examples described herein may also be referred to as a second member, component, region, layer, or section without departing from the teachings of the examples.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application and are not to be interpreted in an idealized or overly formal sense unless expressly so defined herein. The use of the term "may" herein with respect to an example or embodiment, e.g., as to what an example or embodiment may include or implement, means that at least one example or embodiment exists where such a feature is included or implemented, while all examples are not limited thereto.

FIG. 1A illustrates an example of a deep-learning operation using an artificial neural network, according to one or more embodiments.

An artificial intelligence (AI) algorithm including a deep learning technique may input data to a neural network (NN), train the NN with output data through operations, such as convolution, and extract features by using the trained NN. In the NN, nodes are connected to each other and collectively operate to process the input data. Various types of NNs include, for example, a convolutional neural network (CNN), a recurrent neural network (RNN), a deep belief network (DBN), a restricted Boltzmann machine (RBM) model, and so forth, but examples are not limited thereto. In a feed-forward neural network, neurons may have links to other neurons. Such links may extend through the neural network in one direction, for example, in a forward direction.

Figure 1B:
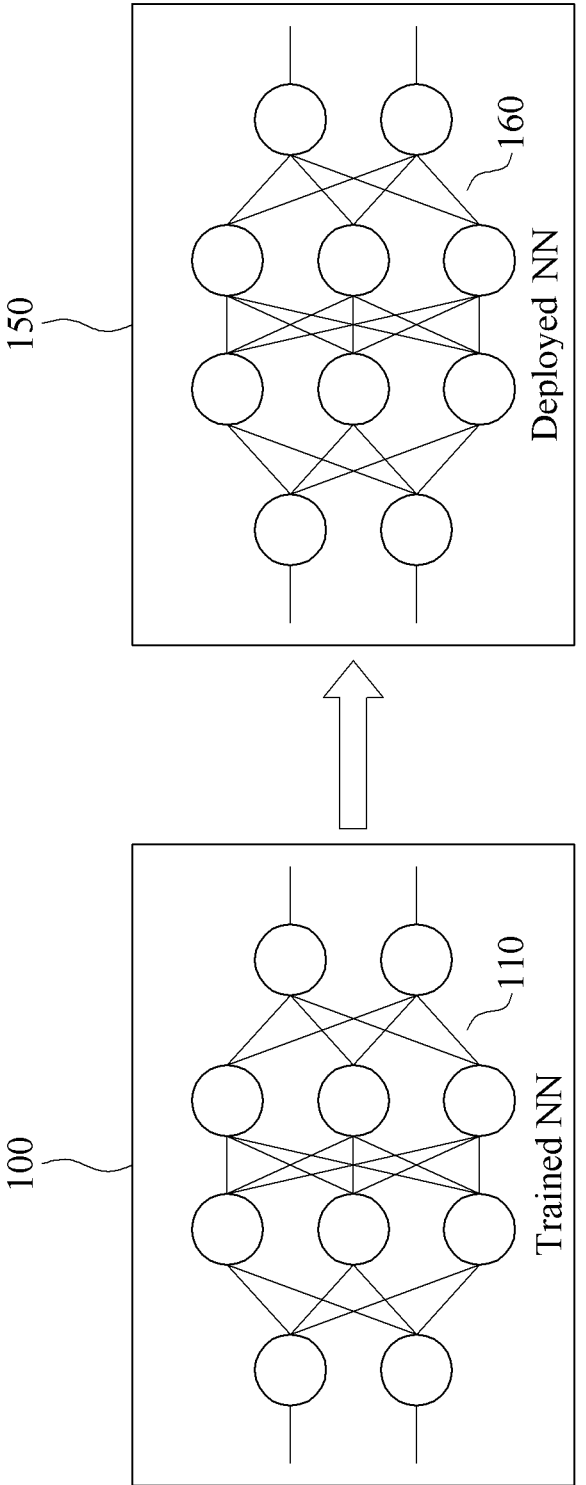
FIG. 1B illustrates an example of an image restoration system, according to one or more embodiments.

FIG. 1A illustrates a structure of an NN 100A (e.g., a CNN) for receiving input data and outputting output data. The NN may be a deep neural network including two or more layers. FIG. 1B illustrates an example of an image restoration system.

Referring to FIG. 1B, the image restoration system may include a training device 100 and an inference device 150. The training device 100 may be a computing device having various processing functions, such as generating a neural network, training or learning a neural network, or retraining a neural network. For example, the training device 100 may be implemented as various devices, such as a PC, a server device, or a mobile device.

The training device 100 may generate one or more trained neural networks 110 by repetitively training or learning a given initial neural network. The generating of the one or more trained neural networks 110 may involve determining (training) neural network parameters. In this case, the neural network parameters may include various types of data, such as input/output activations, weights, and biases that are input to and output from a neural network. When the neural network is repeatedly trained, the parameters of the neural network may be tuned to calculate a more accurate output for a given input.

The training device 100 may transmit the one or more trained neural networks 110 to the inference device 150. The inference device 150 may be included in, for example, a mobile device or an embedded device. The inference device 150 may be a piece of hardware dedicated for driving a neural network and may be an electronic device including at least one of a processor, a memory, an input/output (I/O) interface, a display, a communication interface, or a sensor. For example, the sensor may include one or more cameras or other imaging sensors to capture images of scenes.

The inference device 150 may include all the digital devices that include a memory element and a microprocessor and have an operational capability, such as a tablet PC, a smartphone, a PC (e.g., a laptop computer), an AI speaker, a smart TV, a mobile phone, a navigation, a web pad, a personal digital assistant (PDA), and a workstation. Hereinafter, the inference device 150 may be referred to as a scene representation device.

The inference device 150 may drive the one or more trained neural networks 110 without any change or may drive a neural network 160 to which the one or more trained neural networks 110 are processed (e.g., quantized). The inference device 150 for driving the neural network 160 may be implemented in a separate device from the training device 100. However, examples are not limited thereto, and the inference device 150 may be implemented in the same device as the training device 100. In some embodiments, the training device 100 and the inference device 150 are the same device, and the different terms for the same device reflect the different functions (training and inferencing) that the device may perform.

Figure 2:
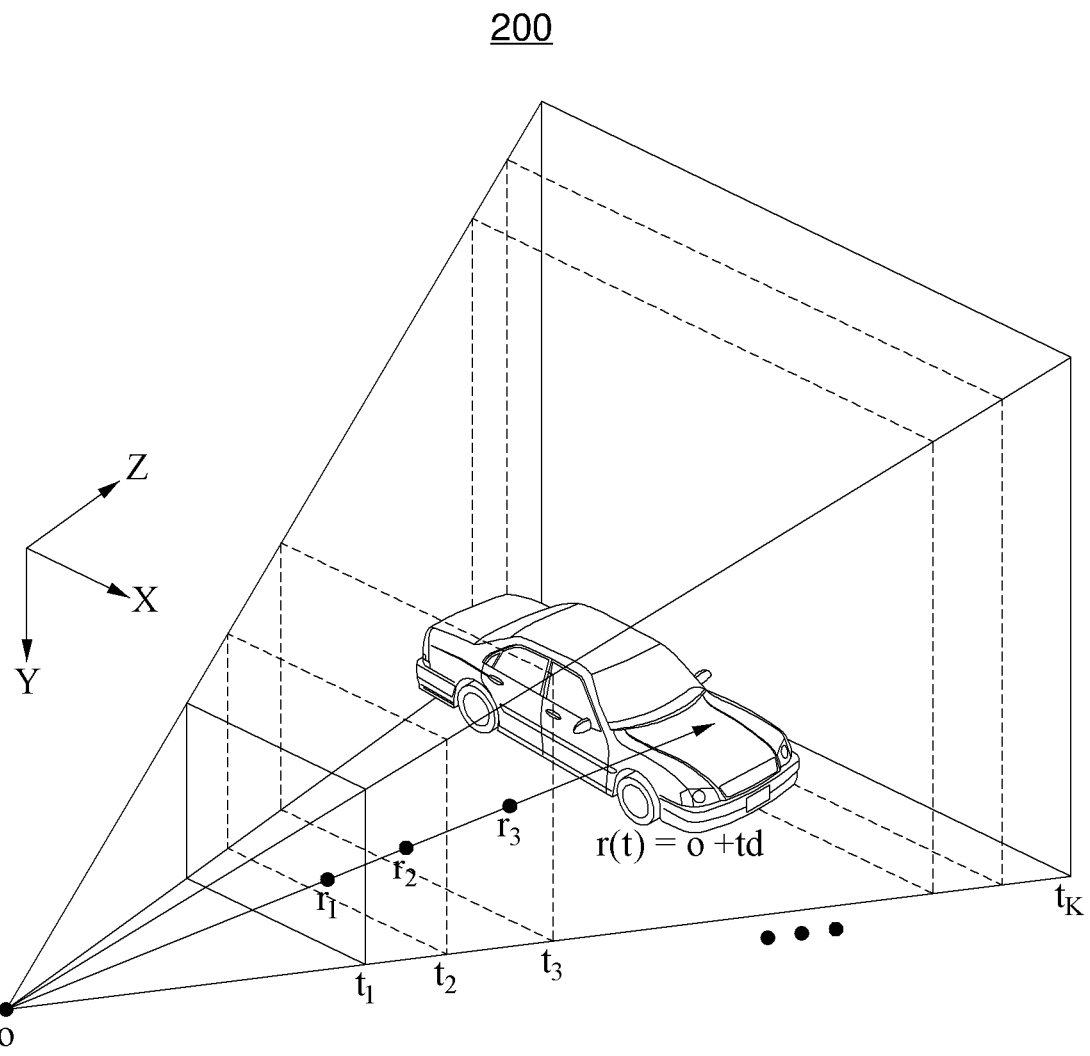
FIG. 2 illustrates an example of a volume-rendering method, according to one or more embodiments.

FIG. 2 illustrates an example 200 of a volume-rendering method.

Referring to FIG. 2, a scene may be trained through an NN model. More specifically, when the NN model may be trained by using images captured from discontinuous (discrete) views, and the NN model may learn the scene and the be capable of representing (inferring) a new random view for which it has not been directly trained (i.e., a view not included in the training dataset used to train the NN).

A ray r may be defined for a pixel position of an image. The ray r is a straight line generated when viewing a 3D object from a certain viewpoint (e.g., a position of a virtual camera). Sampling data may be obtained by sampling points on the ray. The sampling data may include sampling points (e.g., 3D points).

The sampled points on the ray may be sampled a predetermined number of times at a predetermined interval. For example, the points on the ray may be sampled k times at a regular interval, and a total of K 3D positions from x1 to xK may be obtained. In some embodiments, sampling may be irregular or attuned to local conditions.

The NN model may receive spatial information of the sampling data. The spatial information of the sampling data may include spatial information of the ray and sampling information. The spatial information of the ray may include a 2D parameter $(\theta, \phi)$ indicating a direction of the ray r. The sampling information may include 3D position information (x, y, z) of the sampling data. The spatial information of the sampling data may be represented by 5D coordinates (x, y, z, $\theta$, $\phi$).

The NN model may receive the spatial information of the sampling data and output, as a result value, a color value c and a volume density $\sigma$ of a position corresponding to the sampling data. In other words, the NN may generate rendering data for a voxel, for example, corresponding to the sampling data.

When performing inference on all the pieces of sampling data that are sampled on the ray, a color value of a pixel position corresponding to the sampling data may be calculated according to Equation 1 below.

$$C(r) = \sum_k T_k (1 - \exp(\sigma(r_k)\delta(r_k))c(r_k), \qquad \text{Equation 1}$$

$$\text{where } T_k = \exp\left(-\sum_{l=1}^{k-1} \sigma(r_l)\delta(r_l)\right)$$

To render a 2D red, green, and blue (RGB) image of a random (arbitrary) view, inference may be performed for rays of all the respective pixels of the view. In Equation 1, a transmittance $T_k$ (opacity) may be calculated for a current position k, and a volume density of the current position k may be determined. When using a multiplication of the transmittance $T_k$ by the volume density of the current position k as a weight, a pixel color value may be, for example, a weighted sum performed along the ray, which is represented as Equation 2 below.

$$C(r) = \sum_k w_k c_k, \text{ where} \qquad \text{Equation 2}$$

$$w_k = T_k(1 - \exp(\sigma(r_k)\delta(r_k)))$$

$$c_k = c(r_k)$$

Referring to Equation 2, a color value for a ray r may be determined based on a distribution of weights of the ray r.

When inferring using the NN model, the quantity of operations increases as the number of pieces of sampling data increases per ray. In addition, a color value of a pixel may be mainly determined by sample points corresponding to a surface of a scene. Accordingly, when obtaining an image by sampling only the surface of the scene, the number of pieces of sampling data may decrease and the quantity of operations needed to obtain the image may thus decrease.

However, when a distribution of volume-rendering parameters (e.g., a weight of a ray or a volume density) is widely spread around the surface of the scene, a desired image may not be readily obtained by sampling only the surroundings of the surface and applying volume rendering thereto.

Scene representation methods may transform a distribution of volume-rendering parameters to fit for a desired feature (e.g., focusing the distribution near the surface of the scene).

Figure 3:
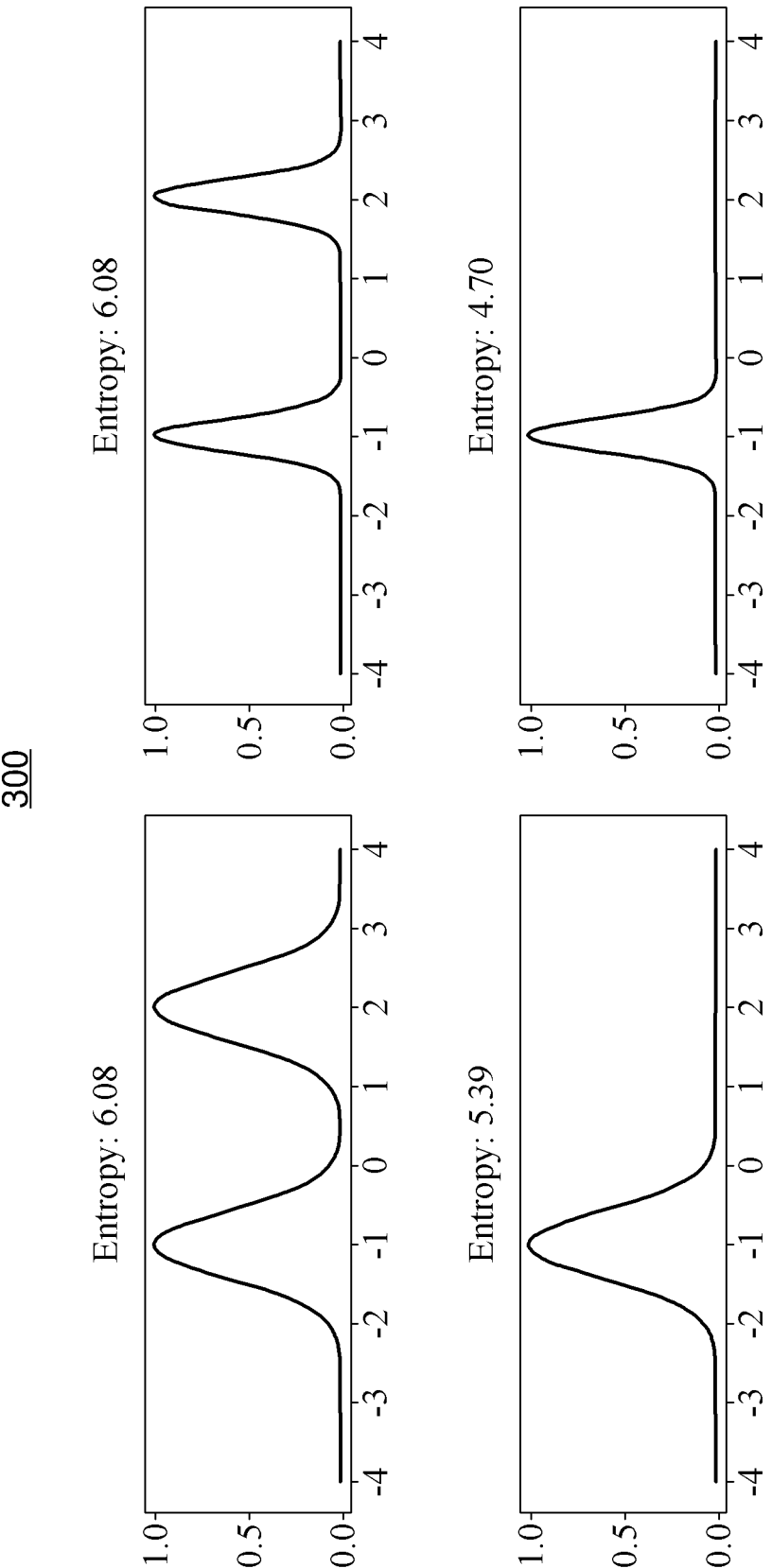
FIG. 3 illustrates an example of entropy, according to one or more embodiments.

FIG. 3 illustrates an example 300 of entropy.

Generally, Shannon entropy may be used to quantify a probability density function (PDF) distribution. The Shannon entropy is a metric that was first proposed in an information theory field, and entropy of a PDF distribution X may be defined as Equation 3 below.

$$H(X) = -\sum_{i=1}^{N} P(x_i)\log P(x_i) \qquad \text{Equation 3}$$

FIG. 3 is a diagram illustrating an example of a Shannon entropy. Referring to FIG. 3, entropy may decrease the more tightly probabilities cluster around a certain bin. For example, entropy in a graph 310 may be lower than entropy in a graph 320 and entropy in a graph 330 may be lower than entropy in a graph 340.

A Rényi entropy is defined as Equation 4 below.

$$H_\alpha(X) = \frac{1}{1-\alpha}\log\left(\sum_{k=1}^{N} p_k^\alpha\right) = \frac{1}{1-\alpha}\log(\|p\|_\alpha^\alpha) \qquad \text{Equation 4}$$

Referring to Equation 4, the Rényi entropy changes the form based on a α value. When α=1, the Rényi entropy may be the same as the Shannon entropy.

When α=2 among possible α values, a norm distribution may have a more convex form. Entropy in this case may be referred to as a Rényi quadratic entropy, which is defined as Equation 5 below.

$$H_2(X) = -\log\left(\sum_{k=1}^{N} p_k^2\right) \qquad \text{Equation 5}$$

Referring to Equation 5, the argument of the −log function may need to increase to decrease entropy value. Therefore, the argument of the −log function may be maximized to gather (concentrate) a PDF distribution in a certain bin. The argument in Equation 5 may be defined as an information potential (IP).

Figure 4:
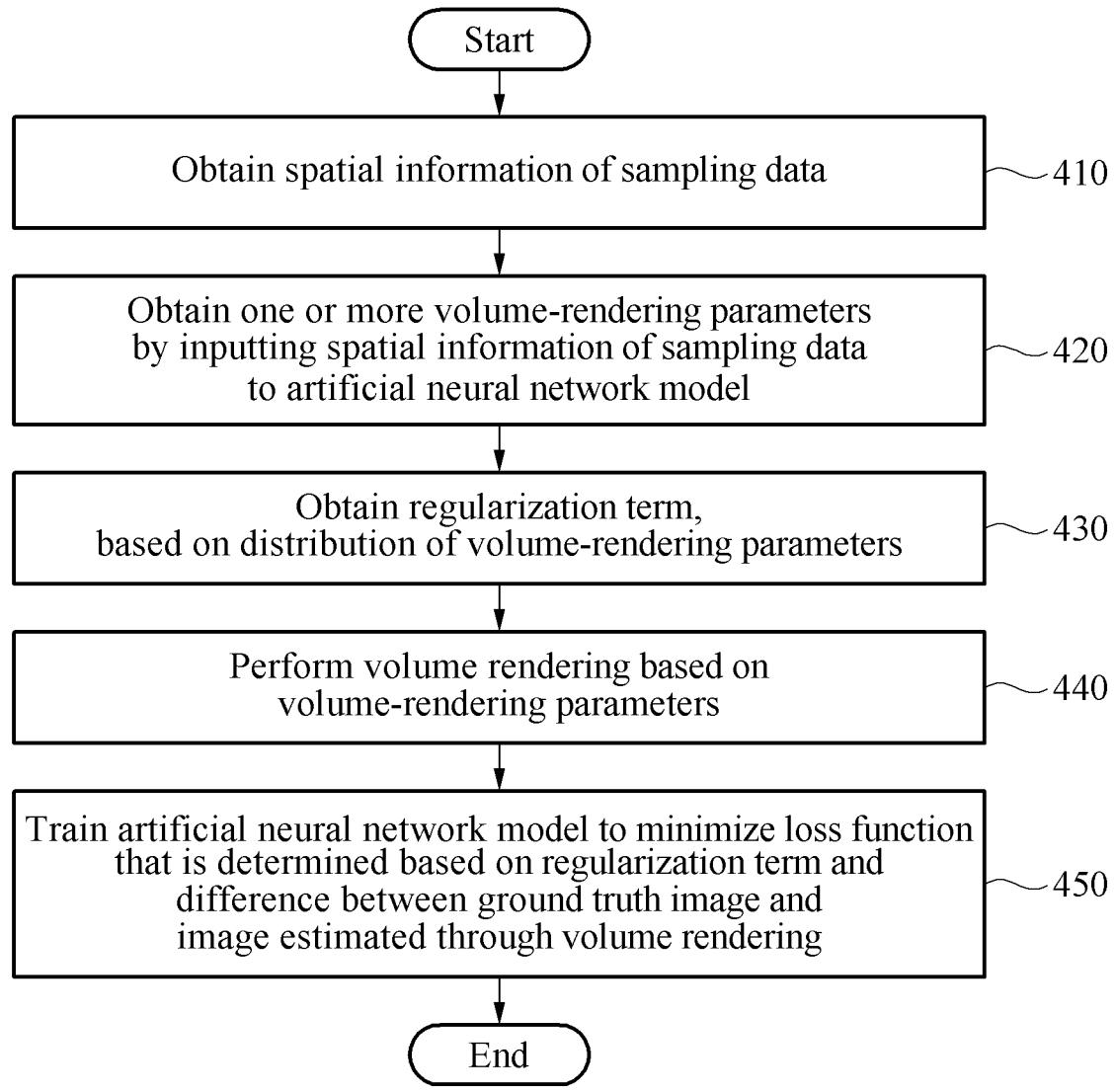
FIG. 4 illustrates an example of a data processing method for training scene representation, according to one or more embodiments.

FIG. 4 illustrates an example of a data processing method for training scene representation. Referring to FIG. 4, operations 410 to 450 may be performed by the training device 200 described above with reference to FIG. 1B. However, operations 410 to 440 may be performed any suitable electronic device in any suitable system. Furthermore, the operations of FIG. 4 may be performed in the shown order and manner. However, the order of some operations may be changed or omitted without departing from the spirit and scope of the shown example. The operations illustrated in FIG. 4 may be performed in parallel or simultaneously.

In operation 410, the training device 200 may obtain spatial information of sampling data. As described above, the spatial information of the sampling data may include spatial information of a ray and sampling information (e.g., sample points), which may be represented by 5D coordinates (x, y, z, θ, φ) of respective sample points.

In operation 420, the training device 200 may obtain/ generate one or more volume-rendering parameters by inputting the spatial information of the sampling data to an NN model. The volume-rendering parameters may be used to perform volume rendering and may include, for example, a weight of a ray, a volume density, and/or a color value.

In operation 430, the training device 200 may obtain a regularization term based on a distribution of the volume-rendering parameters. The regularization term may be used to force the distribution of the volume-rendering parameters to gather or cluster in a certain position.

The training device 200 may obtain the regularization term based on a metric for quantifying a feature of the distribution of the volume-rendering parameters. For example, the training device 200 may obtain entropy corresponding to the distribution of the volume-rendering parameters and obtain an IP corresponding to the volume-rendering parameters, based on the entropy. Detailed methods of transforming the distribution of the volume-rendering parameters by using the regularization term are described below.

In operation 440, the training device 200 may perform volume rendering based on the volume-rendering parameters. The performing of the volume rendering may be an operation of determining a pixel value corresponding to a ray, based on a volume density and a color value of sampling data sampled on the ray.

The training device 200 may generate an estimated image corresponding to a view of a scene by performing volume rendering on all the pixels of the view.

In operation 450, the training device 200 may train the NN model to minimize a loss function that is determined based on the regularization term and a difference between a ground truth (GT) image and the image estimated through the volume rendering.

The training device 200 may train the NN model such that the distribution of the volume-rendering parameters has a predetermined feature. For example, the training device 200 may train the NN model such that the distribution of the volume-rendering parameters is focused on a surface of a scene.

In addition, the training device 200 may train the NN model to maximize an IP.

Figure 5A:
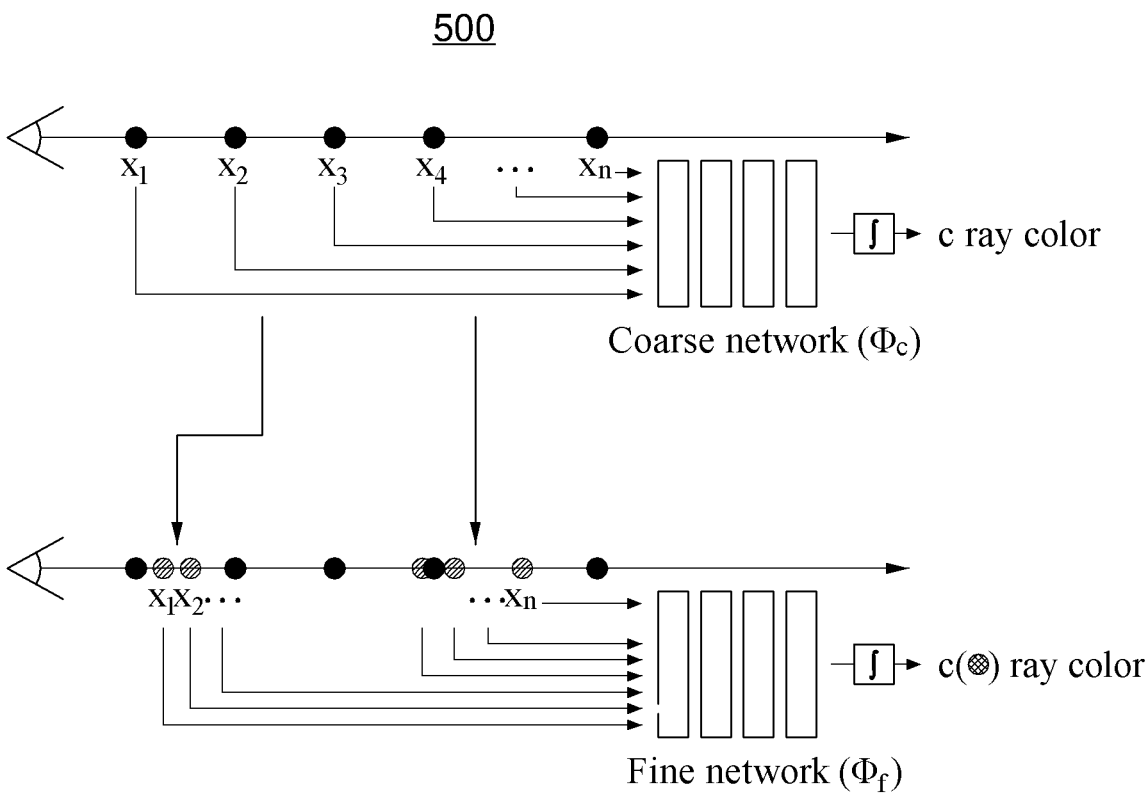
FIG. 5A illustrates an example of a method of training an artificial neural network model, according to one or more embodiments.
Figure 5B:
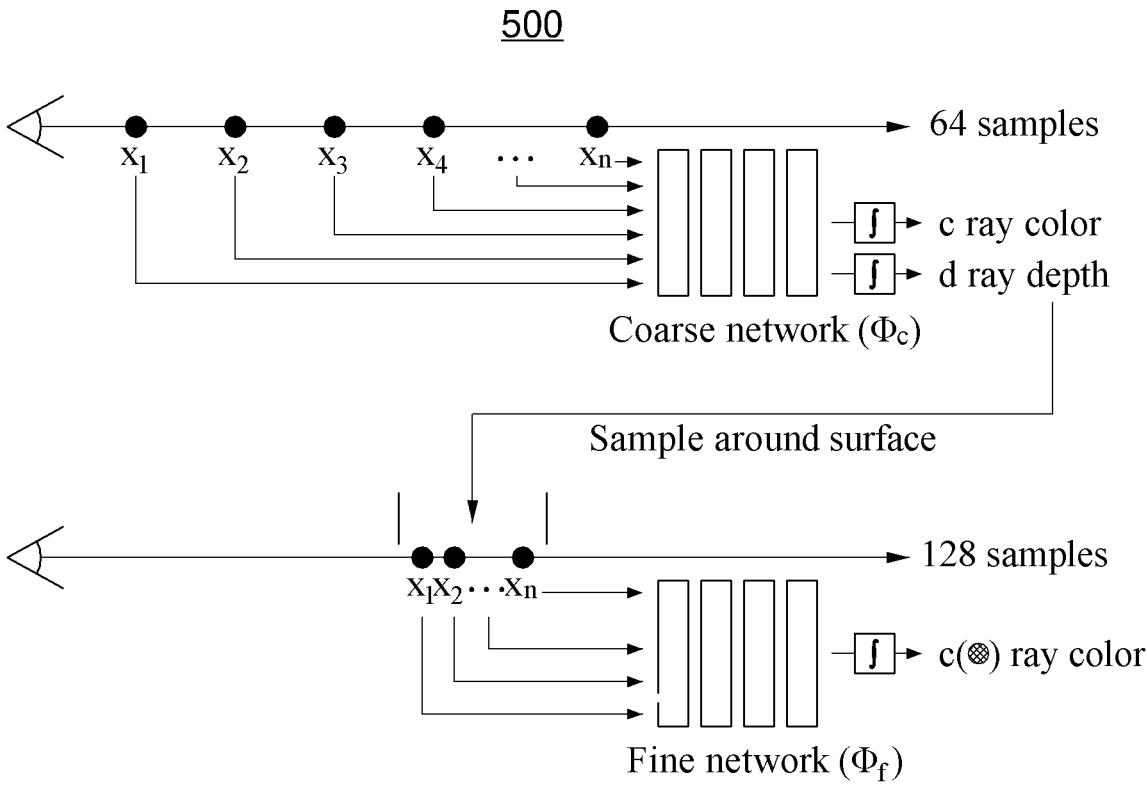
FIG. 5B illustrates an example of a method of training an artificial neural network model, according to one or more embodiments.

FIGS. 5A and 5B each illustrate an example of training an NN model 500. The NN model 500 may include a first network and a second network. The first network may be referred to as a coarse network, and the second network may be referred to as a fine network.

The training device 200 may obtain a color value by using the first network. The training device 200 may determine additional sampling data based on an output of the first network and perform volume rendering by inputting the additional sampling data to the second network.

The training device 200 may train the NN model by using a loss function obtained by adding a second loss function to a first loss function. The first loss function may be referred to as a photometric loss, that is, a loss function determined based on a difference between a ground truth image and an image estimated through volume rendering. The second loss function may be a loss function determined based on a regularization term. For example, the second loss function may be a loss function determined based on an entropy-based regularization term. The loss function may be defined as Equation 6 below.

$$\text{Loss} = L_p(\Phi_c, \Phi_f) + \lambda R(\Phi_c) \qquad \text{Equation 6}$$

In Equation 6, $L_p(\phi_c, \phi_f)$ denotes the first loss function, $R(\phi_c)$ denotes the second loss function, $\phi_c$ denotes a trained first network (e.g., a coarse network), and $\phi_f$ denotes a trained second network (e.g., a fine network). In addition, $\lambda$ denotes a parameter for adjusting the contribution of the regularization term. The first loss function $L_p(\phi_c, \phi_f)$ may be defined as Equation 7 below.

$$L_p(\Phi_c, \Phi_f) = \sum_{r \in \mathcal{R}} \left[ \left\| \hat{C}(r; \Phi_c) - C(r) \right\|_2^2 + \left\| \hat{C}(r; \Phi_f) - C(r) \right\|_2^2 \right] \qquad \text{Equation 7}$$

In Equation 7, $\hat{C}$ denotes the image (e.g., an RGB value of the image) estimated through volume rendering and C denotes the ground truth image (e.g., an RGB value of the ground truth image).

Referring to FIG. 5B, the training device 200 may output depth information together with a color value by using the first network. The training device 200 may determine a sampling section based on the depth information of the first network. For example, the training device 200 may determine a surface area of a scene, based on the depth information of the first network, and determine the surface area of the scene to be the sampling section.

The training device 200 may perform sampling on the determined sampling section and perform volume rendering by inputting the sampling data (sampled for the section) to the second network.

Figure 6:
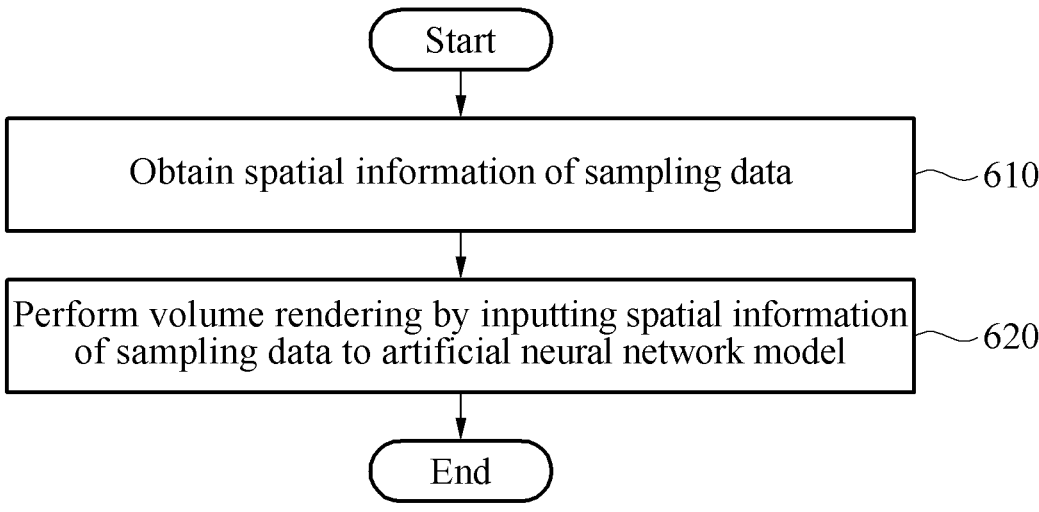
FIG. 6 illustrates an example of a scene representation method, according to one or more embodiments.

FIG. 6 illustrates an example of a scene representation method. Referring to FIG. 6, operations 610 and 620 may be performed by the inference device 150 described above with reference to FIG. 1B. However, operations 610 and 620 may be performed by any suitable electronic device in any suitable system.

Furthermore, the operations of FIG. 6 may be performed in the shown order and manner. However, the order of some operations may be changed or omitted without departing from the spirit and scope of the shown example. The operations illustrated in FIG. 6 may be performed in parallel or simultaneously.

The inference device 150 may perform inference by using an NN trained to transform a distribution of volume-rendering parameters to a certain position (e.g., a surface of a scene). In other words, the inference device 150 may perform sampling for obtaining a decreased number of pieces of sampling data in a position corresponding to the transformed distribution of the volume-rendering parameters instead of sampling performed at a regular interval on an arbitrary ray. Accordingly, the inference device 150 may decrease the number of operations needed for volume rendering.

In operation 610, the inference device 150 may obtain spatial information of sampling data. As described above, the spatial information of the sampling data may include spatial information of a ray and sampling information, which may be represented by 5D coordinates $(x, y, z, \theta, \phi)$.

The sampling information may be determined based on a distribution of one or more parameters for volume rendering. The sampling information may include of position information and/or information on the number of pieces of sampling data.

The inference device 150 may obtain a depth map corresponding to a scene. For example, the inference device 150 may obtain the depth map corresponding to the scene by using an NN for estimating a depth map. The inference device 150 may obtain surface information corresponding to the scene. For example, the inference device 150 may obtain the surface information corresponding to the scene based on the depth map.

In operation 620, the inference device 150 may perform volume rendering by inputting the spatial information of the sampling data to an NN model. The inference device 150 may obtain a volume density and a color value corresponding to the spatial information of the sampling data and perform volume rendering based on the volume density and the color value.

The NN model may be trained to transform the distribution of the one or more parameters to be used to perform the volume rendering.

Figure 7:
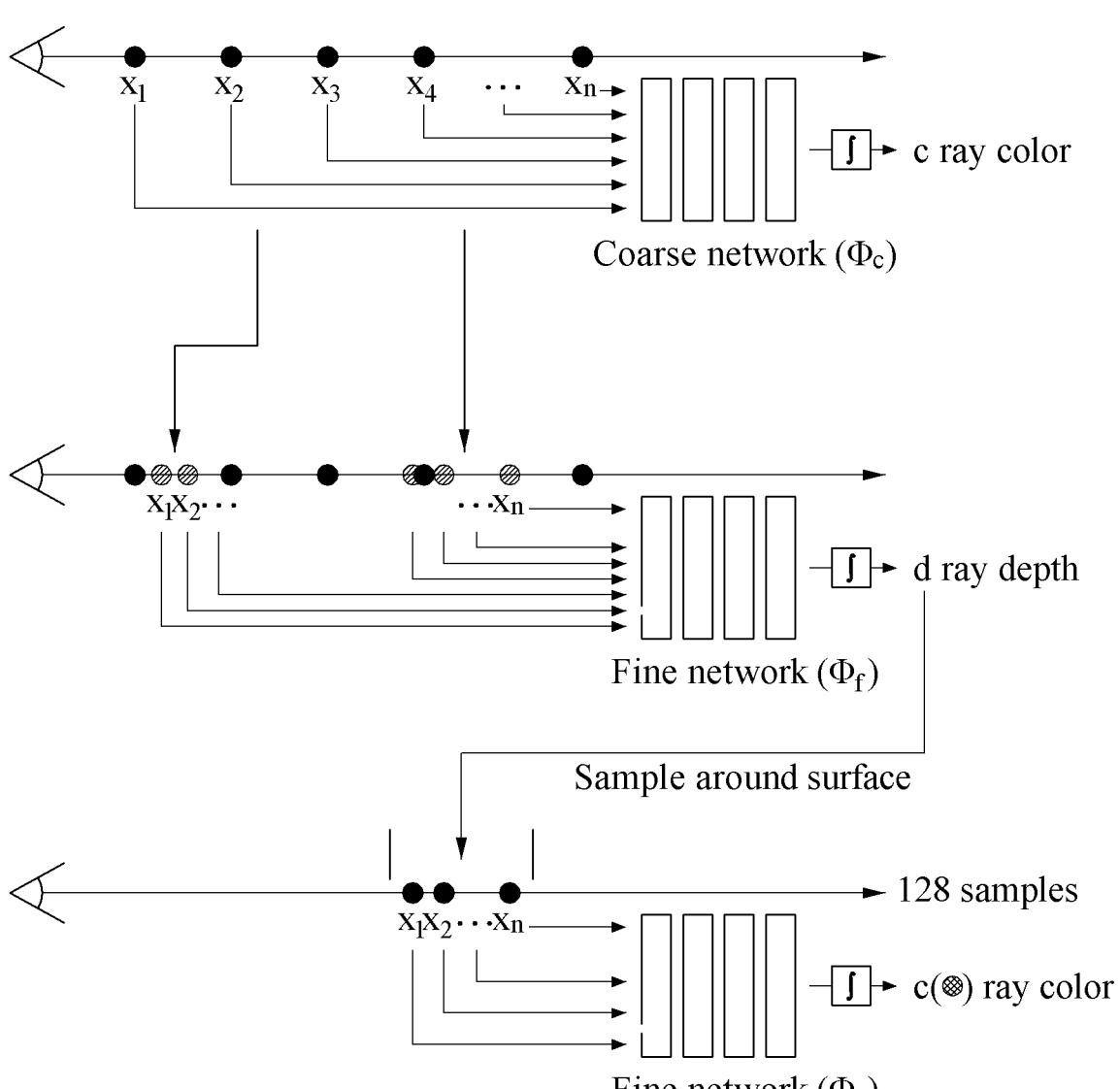
FIG. 7 illustrates an example of an inference operation of an artificial neural network model, according to one or more embodiments.

FIG. 7 illustrates an example 700 of an inference operation of an NN model. Referring to FIG. 7, the ANN model may include a first network and a second network. The first network may be referred to as a coarse network, and the second network may be referred to as a fine network.

The inference device 150 may obtain a color value by using the first network. The inference device 150 may obtain depth information by using the second network.

The inference device 150 may estimate the position of a surface of a scene, based on the depth information, perform sampling based on an estimated surface, and perform volume rendering by inputting sampling data to the second network.

Figure 8:
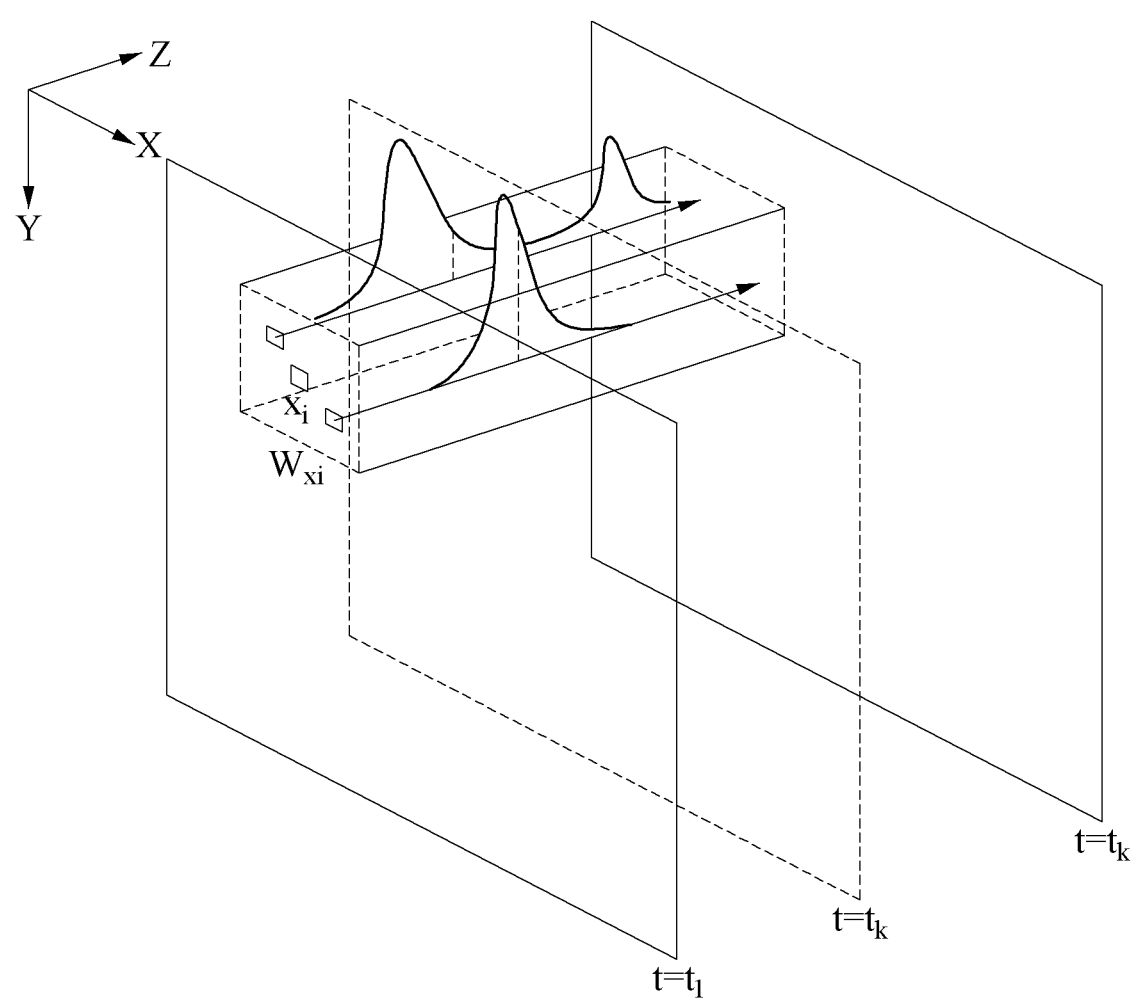
FIG. 8 illustrates an example of a method of determining a regularization term by considering a surrounding distribution of parameters, according to one or more embodiments.

FIG. 8 illustrates an example of determining a regularization term by considering a surrounding distribution of parameters.

Referring to FIG. 8, an ANN model may determine the regularization term by considering the surrounding distribution of parameters (e.g., a weight) together with a current pixel position, which is defined as Equation 8 below.

$$R = -\sum_k \sum_{x_i \in \mathcal{R}} \left( \frac{1}{|W_{x_i}|} \sum_{x_j \in W_{x_i}} w(r_{k,j}) \right)^2 \qquad \text{Equation 8}$$

-continued $$= -\sum_{x_i \in \mathcal{R}} \sum_k \left( \frac{1}{|W_{x_i}|} \sum_{x_j \in W_{x_i}} w(r_{k,j}) \right)^2$$

Here, $W_x$ denotes a set of sample positions that are within a certain area centered on a pixel position x. The certain area may be 2D or 3D. For example, the certain area may be 3*3, 5*5, 3*3*3, or 5*5*5.

Figure 9:
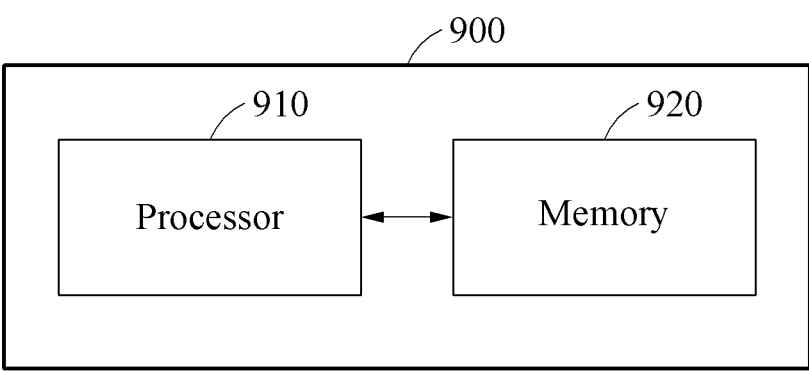
FIG. 9 illustrates an example of a training device, according to one or more embodiments.

FIG. 9 illustrates an example of a training device.

Referring to FIG. 9, a training device 900 may include one or more processors 910 and a memory 920. The memory 920 may store computer-readable instructions. When the computer-readable instructions stored in the memory 920 are executed by the processor 910, the processor 910 may process operations defined by the computer-readable instructions. The memory 920 may include, for example, random access memory (RAM), dynamic RAM (DRAM), static RAM (SRAM), or other types of non-volatile memory known in the art.

The one or more processors 910 may control the overall operation of the training device 900. The processor 910 may be a hardware-implemented device having a circuit that is physically structured to execute desired operations. The desired operations may include instructions or code included in a program. The hardware-implemented device may include, for example, a microprocessor, a central processing unit (CPU), a graphics processing unit (GPU), a processor core, a multi-core processor, a multiprocessor, an application-specific integrated circuit (ASIC), a field-programmable gate array (FPGA), and a neural processing unit (NPU).

The processor 910 may control the training device 900 by executing instructions and functions to be executed by the training device 900. The training device 900, under control by the processor 910, may obtain spatial information of sampling data, obtain one or more volume-rendering parameters by inputting the spatial information of the sampling data to an ANN model, obtain a regularization term based on a distribution of the volume-rendering parameters, perform volume rendering based on the volume-rendering parameters, and train the ANN model to minimize a loss function determined based on the regularization term and a difference between a ground truth image and an image that is estimated through the volume rendering.

Figure 10:
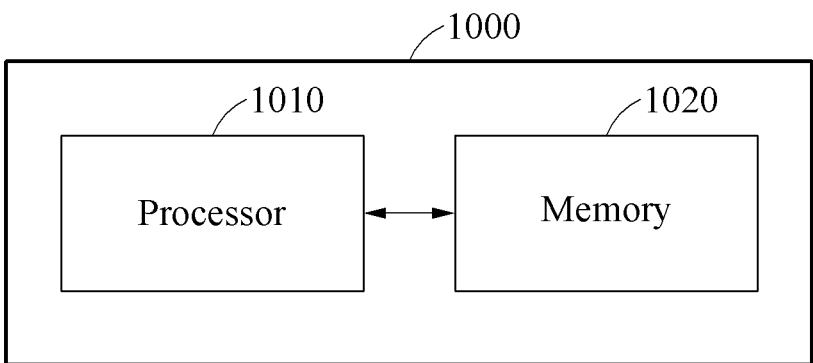
FIG. 10 illustrates an example of an inference device, according to one or more embodiments.

FIG. 10 illustrates an example configuration of an inference device.

Referring to FIG. 10, an inference device 1000 may include one or more processors 1010 and a memory 1020. The memory 1020 may store computer-readable instructions. When the computer-readable instructions stored in the memory 1020 are executed by the processor 1010, the processor 1010 may process operations defined by the computer-readable instructions. The memory 1020 may include, for example, RAM, DRAM, SRAM, or other types of non-volatile memory known in the art. The memory 1020 may store a pre-trained ANN model.

The one or more processors 1010 ("processor") may control the overall operation of the inference device 1000. The processor 1010 may be a hardware-implemented device having a circuit that is physically structured to execute desired operations. The desired operations may include instructions or code included in a program. The hardware-implemented device may include, for example, a microprocessor, a CPU, a GPU, a processor core, a multi-core processor, a multiprocessor, an ASIC, an FPGA, and an NPU.

The processor 1010 may control the inference device 1000 by executing instructions and functions to be executed by the inference device 1000.

The inference device 1000, under control of the processor 1010, may obtain spatial information of sampling data and perform volume rendering by inputting the spatial information of the sampling data to an ANN model, in which the spatial information of the sampling data is determined based on a distribution of one or more parameters needed to perform the volume rendering.

The computing apparatuses, the electronic devices, the processors, the memories, the image sensors, the displays, the information output system and hardware, the storage devices, and other apparatuses, devices, units, modules, and components described herein with respect to FIGS. 1-10 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-10 that perform the operations described in this application are performed by computing hardware, for example, by one or more processors or computers, implemented as described above implementing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, in addition to the above disclosure, the scope of the disclosure may also be defined by the claims and their equivalents, and all variations within the scope of the claims and their equivalents are to be construed as being included in the disclosure.

What is claimed is:

1. A method of training a neural network model for scene representation, the method comprising:
   obtaining spatial information of sampling data, the spatial information including information about points sampled from a ray or from a three-dimensional model;
   obtaining volume-rendering parameters by inputting the spatial information of the sampling data to the neural network model, which generates the volume-rendering parameters, the volume-rendering parameters corresponding to the points, respectively;
   obtaining a regularization term quantifying a statistical distribution of the volume-rendering parameters;
   performing volume rendering based on the volume-rendering parameters; and
   training the neural network model to minimize a loss function, wherein the loss function is determined based on the regularization term and is determined based on a difference between a ground truth image and an image that is estimated according to the volume rendering.

2. The method of claim 1, wherein the training the neural network model comprises:
   training the neural network model such that the distribution of the volume-rendering parameters has a predetermined feature.

3. The method of claim 2, wherein the training the neural network model comprises:
   training the neural network model such that the distribution of the volume-rendering parameters is clustered on a surface of a scene.

4. The method of claim 1, wherein the obtaining the regularization term comprises:
   obtaining the regularization term based on a metric quantifying a feature of the distribution of the volume-rendering parameters.

5. The method of claim 1, wherein the obtaining the regularization term comprises:
   obtaining an entropy measure corresponding to the distribution of the volume-rendering parameters; and obtaining an information potential corresponding to the volume-rendering parameters, based on the entropy measure.

6. The method of claim 5, wherein the training the neural network model is performed such that the information potential is maximized.

7. The method of claim 1, wherein the loss function is determined by adding a second loss function to a first loss function, wherein the first loss function is determined based on the difference between the ground truth image and the image is estimated through the volume rendering and the second loss function is determined based on the regularization term.

8. The method of claim 1, wherein the obtaining the regularization term comprises:

obtaining the distribution of the volume-rendering parameters corresponding to sample point of sampling data included in a set of sample points in a predetermined area;

obtaining a statistical value of the distribution of the volume-rendering parameters corresponding to the sample points; and determining the statistical value to be the regularization term.

9. The method of claim 1, wherein the obtaining the spatial information of the sampling data comprises obtaining spatial information of a ray and obtaining sampling information.

10. A scene representation method comprising:

obtaining spatial information of sampling data, the sampling data sampled from a three-dimensional (3D) model, the spatial information including information about points sampled from a ray or from a three-dimensional model; and performing volume rendering of the 3D model by inputting the spatial information of the sampling data to a neural network model that generates volume rendering parameters, wherein the spatial information of the sampling data is determined based on a quantification of an amount of information in the volume rendering parameters.

11. The method of claim 10, wherein the neural network model is trained to transform the distribution of the volume rendering parameters to perform the volume rendering.

12. The method of claim 10, wherein the spatial information of sampling data comprises at either position information or information on a number of sample points in the sampling data.

13. The method of claim 10, wherein the obtaining the spatial information of sampling data further comprises obtaining a depth map corresponding to a scene of the 3D model.

14. The method of claim 10, wherein the obtaining the spatial information of sampling data further comprises obtaining information on a surface of the 3D model.

15. The method of claim 10, wherein the obtaining the spatial information of the sampling data comprises obtaining spatial information of a ray and obtaining sampling information.

16. A non-transitory computer-readable storage medium storing instructions that, when executed by a processor, cause the processor to perform the method of claim 1.

17. An electronic device comprising:

one or more processors;

memory storing instructions configured to, when executed by the one or more processors, cause the one or more processors to:

obtain spatial information of sampling data, the spatial information including information about points sampled from a ray or from a three-dimensional model, obtain volume-rendering parameters by inputting the spatial information of the sampling data to a neural network model, which generates the volume-rendering parameters, the volume-rendering parameters corresponding to the points, respectively, obtain a regularization term quantifying an amount of information in the volume-rendering parameters, perform volume rendering based on the volume-rendering parameters, and train the neural network model to minimize a loss function, wherein the loss function is determined based on the regularization term and is determined based on a difference between a ground truth image and an image that is estimated according to the volume rendering.

18. The electronic device of claim 17, wherein the instructions are further configured to cause the one or more processors to train the neural network model such that the distribution of the volume-rendering parameters has a predetermined feature.

19. The electronic device of claim 17, wherein the instructions are further configured to cause the one or more processors to train the neural network model such that the distribution of the volume-rendering parameters is clustered on a surface of a scene.

20. The electronic device of claim 17, wherein the instructions are further configured to cause the one or more processors to obtain the regularization term based on a metric for quantifying a feature of the distribution of the volume-rendering parameters.

21. An electronic device comprising:

one or more processors configured to obtain spatial information of sampling data, the sampling data sampled from a ray or a three-dimensional (3D) model, and perform volume rendering of the 3D model by inputting the spatial information of the sampling data to a neural network model that generates volume rendering parameters, wherein the spatial information of the sampling data is determined based on a regularization term quantifying an amount of information in the volume rendering parameters.

* * * * *